(12) United States Patent
Banks et al.

(10) Patent No.: US 9,730,113 B2
(45) Date of Patent: Aug. 8, 2017

(54) APPARATUS AND METHOD FOR HANDOVER FOR BASE STATIONS WITH CELLULAR BACKHAUL

(71) Applicant: Vodafone IP Licensing Limited, Newbury, Berkshire (GB)

(72) Inventors: Robert Edward Banks, London (GB); Sandra Bender, London (GB); Ralf Irmer, London (GB)

(73) Assignee: Vodafone IP Licensing Limited, Berkshire (GB)

( * ) Notice: Subject to any disclaimer, the term of this patent is extended or adjusted under 35 U.S.C. 154(b) by 65 days.

(21) Appl. No.: 14/715,430

(22) Filed: May 18, 2015

(65) Prior Publication Data
US 2015/0334604 A1    Nov. 19, 2015

(30) Foreign Application Priority Data

May 19, 2014    (GB) .................... 1408863.7

(51) Int. Cl.
*H04W 4/00*    (2009.01)
*H04W 36/00*    (2009.01)
(Continued)

(52) U.S. Cl.
CPC ........ *H04W 36/0011* (2013.01); *H04W 4/046* (2013.01); *H04W 36/0083* (2013.01);
(Continued)

(58) Field of Classification Search
CPC . H04W 4/046; H04W 36/0083; H04W 36/32; H04W 84/005
(Continued)

(56) References Cited

U.S. PATENT DOCUMENTS 7,343,160 B2    3/2008    Morton
7,929,970 B1    4/2011    Gunasekara et al.
(Continued)

FOREIGN PATENT DOCUMENTS

EP    1 657 942 A1    5/2006
EP    2 051 458 A2    4/2009
(Continued)

OTHER PUBLICATIONS

European Search Report dated Sep. 24, 2015 for EP Application No. EP 15 16 7823.
(Continued)

*Primary Examiner* — Sai-Ming Chan
(74) *Attorney, Agent, or Firm* — Knobbe, Martens, Olson & Bear, LLP

(57) ABSTRACT

Control of handover management at a first base station in a cellular network is provided. A separate, provisioning base station of the cellular network may provide the first base station with a radio backhaul interface to a core network part of the cellular network. Then, handover status information may be communicated to the first base station, the information being based on a handover status for the provisioning base station. Additionally or alternatively, the first base station is configured for operation whilst mobile and a mobility parameter is determined for it, relating to a change in location for the first base station. Handover status information is communicated to the first base station based on the determined mobility parameter.

20 Claims, 8 Drawing Sheets

(51) Int. Cl.
  *H04W 4/04* (2009.01)
  *H04W 36/32* (2009.01)
  *H04W 84/00* (2009.01)
  *H04W 84/04* (2009.01)

(52) U.S. Cl.
  CPC .......... *H04W 36/32* (2013.01); *H04W 84/005* (2013.01); *H04W 84/047* (2013.01)

(58) Field of Classification Search
  USPC ........................................................ 370/331
  See application file for complete search history.

(56) References Cited

U.S. PATENT DOCUMENTS

| | | | |
|---|---|---|---|
| 2006/0109818 A1* | 5/2006 | Ramanna | H04W 36/14 370/331 |
| 2008/0119182 A1 | 5/2008 | Kwun et al. | |
| 2008/0146226 A1 | 6/2008 | Claussen et al. | |
| 2008/0293420 A1 | 11/2008 | Jang et al. | |
| 2009/0052395 A1 | 2/2009 | Bao et al. | |
| 2009/0196253 A1 | 8/2009 | Semper | |
| 2010/0061339 A1 | 3/2010 | Kim et al. | |
| 2010/0120447 A1 | 5/2010 | Anderson et al. | |
| 2010/0124927 A1 | 5/2010 | Eskicioglu et al. | |
| 2010/0124931 A1 | 5/2010 | Eskicioglu et al. | |
| 2010/0210268 A1 | 8/2010 | Lim et al. | |
| 2010/0234071 A1 | 9/2010 | Shabtay et al. | |
| 2010/0240368 A1 | 9/2010 | Fox et al. | |
| 2011/0007712 A1 | 1/2011 | Lee | |
| 2011/0039560 A1 | 2/2011 | Hratko et al. | |
| 2011/0053596 A1 | 3/2011 | Wohlert et al. | |
| 2011/0194530 A1 | 8/2011 | Tinnakornsrisuphap et al. | |
| 2011/0217947 A1 | 9/2011 | Czaja et al. | |
| 2011/0230195 A1 | 9/2011 | Li et al. | |
| 2011/0244870 A1 | 10/2011 | Lee | |
| 2011/0275378 A1 | 11/2011 | Kwon et al. | |
| 2012/0039299 A1 | 2/2012 | Teyeb et al. | |
| 2012/0155377 A1 | 6/2012 | Chai | |
| 2012/0172045 A1* | 7/2012 | Fukuta | H04W 36/32 455/440 |
| 2012/0264433 A1 | 10/2012 | Winnett et al. | |
| 2013/0023302 A1 | 1/2013 | Sivanesan et al. | |
| 2013/0045749 A1 | 2/2013 | Sridhar et al. | |
| 2013/0079003 A1 | 3/2013 | Nagaraja et al. | |
| 2013/0079007 A1 | 3/2013 | Nagaraja et al. | |
| 2013/0089075 A1 | 4/2013 | Lim | |
| 2013/0143578 A1 | 6/2013 | Lekutai | |
| 2013/0189971 A1 | 7/2013 | Callender et al. | |
| 2013/0225171 A1 | 8/2013 | Singh et al. | |
| 2013/0237231 A1 | 9/2013 | Nagaraja et al. | |
| 2013/0260760 A1 | 10/2013 | Pan et al. | |
| 2014/0128075 A1 | 5/2014 | Da Silva et al. | |
| 2015/0189556 A1 | 7/2015 | Sidhu et al. | |
| 2015/0289153 A1 | 10/2015 | Gopal et al. | |
| 2916/0095006 | 3/2016 | Hevizi et al. | |

FOREIGN PATENT DOCUMENTS

| | | |
|---|---|---|
| EP | 2 496 028 A1 | 9/2012 |
| EP | 2 541 990 A1 | 1/2013 |
| GB | 2484414 A | 4/2012 |
| JP | 2009 284432 A | 12/2009 |
| JP | 2013 031224 A | 2/2013 |
| KR | 2010 0046492 A | 5/2010 |
| KR | 2013 0078234 A | 7/2013 |
| WO | WO 00/36858 | 6/2000 |
| WO | WO 2010/080013 A2 | 7/2010 |
| WO | WO 2011/020481 A1 | 2/2011 |
| WO | WO 2011/053534 A1 | 5/2011 |
| WO | WO 2012/041387 A1 | 4/2012 |
| WO | WO 2012/158085 A1 | 11/2012 |
| WO | WO 2012/158094 A1 | 11/2012 |
| WO | WO 2013/023171 A1 | 2/2013 |
| WO | WO 2013/025166 A1 | 2/2013 |
| WO | WO 2013/040743 A1 | 3/2013 |
| WO | WO 2013/093575 A1 | 6/2013 |
| WO | WO 2013/169172 A1 | 11/2013 |
| WO | WO 2013/191505 A1 | 12/2013 |

OTHER PUBLICATIONS

European Search Report dated Sep. 29, 2015 for EP Application No. 15 16 7839.
Partial European Search Report dated Oct. 1, 2015 for EP Application No. 15 16 7844.
China Unicom, "Discussion of Mobile Relay Architecture and Group mobility," 3rd Generation Partnership Project (3GPP), Mobile Competence Centere, vol. RAN WG3, Jan. 31, 2012.
Potevio, "Ho-region specific parameters adjusting based on cell type," 3rd Generation Partnership Project (3GPP), Mobile Competence Centere, vol. RAN WG2, Apr. 4, 2013.
European Search Reported dated Oct. 1, 2015 for EP Application No. 15 16 7844.
Office Action issued in U.S. Appl. No. 14/715,472, mailed Jul. 18, 2016 in 13 pages.
Office Action issued in U.S. Appl. No. 14/715,434, mailed Jul. 15, 2016 in 11 pages.
International Search Report dated Sep. 5, 2014 for GB Application No. 1408858.7 filed May 19, 2014.
International Search Report dated Sep. 23, 2014 for GB Application No. 1408859.5 filed May 19, 2014.
International Search Report dated Sep. 23, 2014 for GB Application No. 1408863.7 filed May 19, 2014.
Farnham, Tim et al., "Collaborative Radio Resource Management for Femto-Cell Networks," Future Network & MobileSummit Conference, Jun. 16-18, 2010, 7 pgs.
Feteiha, Mohamed F., et al., "Pairwise Error Probability Evaluation of Cooperative Mobile Femtocels," Global Communications Conference, Dec. 9-13, 2013, 6 pgs.
Jangsher, Sobia et al., "Resource Allocation in Cellular Networks Employing Mobile Femtocels with Deterministric Mobility," IEEE Wireless Communications and Networking Conference, Apr. 7-10, 2013, p. 819-824.
Haider, Fourat et al., "A Simulation Based Study of Mobile Femtocell Assisted LTE Networks," 2011 7¯th International Wireless Communications and Mobile Computing Conference (IWCMC), Jul. 4-8, 2011, 6 pgs.
Haider, Fourat et al., "Spectral Efficiency Analysis of Mobile Femtocell Based Cellular Systems," 2011 IEEE $13^{th}$ International Conference on Communication Technology, Sep. 25-28, 2011, 5 pgs.
Namal, Suneth et al., "Realization of Mobile Femtocels: Operational and Protocol Requirements," Springer Science & Business Media, LLC, published online: Nov. 18, 2012, pp. 339-364.
Priebe, Tom, "Current Development and Innovations in the Area of Femto Cells," 2012, Berline Institute of Technology, 6 pgs.
Smrati, et al., "Group Handover Management in Mobile Femtocell Network Based on Art Map Class1," International Journal of Scientific & Engineering Research, vol. 4, Issue 8, Aug. 2013, 8 pgs.

* cited by examiner

| Use Case | | Train location | Train doors | End user location | End user device | Rest of network coverage available to end user? | On train system coverage available to end user? | Desired Outcome |
|---|---|---|---|---|---|---|---|---|
| Typical 1 | | S/S | C | On platform | Idle | Yes | Yes | End user device idle on Network |
| | | S/S | O | On platform (opposite open doors) | Idle | Yes | Yes | End user device remains idle on Network ie. does not change to idle on Train System |
| | | S/S | C | On platform | Idle | Yes | Yes | End user device idle on Network |
| Typical 2 | | S/S | C | On platform | Idle | Yes | Yes | End user device idle on Network |
| | | S/S | O | On platform (opposite open doors) | Idle | Yes | Yes | End user device remains idle on Network ie. does not change to idle on Train System |
| | | S/S | O | Walks onto train | Idle | Yes | Yes | End user device idle on Network but hands over to Train System to idle on Train System |
| | | S/S | C | On train | Idle | Yes | Yes | End user device idle on Train System |
| Typical 3 | | S/S | C | On platform | In call/session | Yes | Yes | End user device in service on Network |
| | | S/S | O | On platform (opposite open doors) | In call/session | Yes | Yes | End user device remains in service on Network ie. does not change to in service on Train System |
| | | S/S | C | On platform | In call/session | Yes | Yes | End user device in service on Network |

FIG. 2A

| Use Case | | Train location | Train doors | End user location | End user device | Rest of network coverage available to end user? | On train system coverage available to end user? | Desired Outcome |
|---|---|---|---|---|---|---|---|---|
| Typical 4 | | S/S | C | On platform | In call/session | Yes | Yes | End user device in service on Network |
| | | S/S | O | On platform (opposite open doors) | In call/session | Yes | Yes | End user device remains in service on Network ie. does not change to in service on Train System |
| | | S/S | O | Walks onto train | In call/session | Yes | Yes | End user device remains in service on Network but hands over to Train System so in service on Train System |
| | | S/S | C | On train | In call/session | Yes | Yes | End user device in service on Train System |
| Typical 5 | | S/S | C | On train | Idle | Yes | Yes | End user device idle on Train System |
| | | S/S | O | On train (by open doors) | Idle | Yes | Yes | End user device remains idle on Train System ie. does not change to idle on Network |
| | | S/S | C | On train | Idle | Yes | Yes | End user device idle on Train System |
| Typical 6 | | S/S | C | On train | Idle | Yes | Yes | End user device idle on Train System |
| | | S/S | O | On train (by open doors) | Idle | Yes | Yes | End user device remains idle on Train System but hands over to Network so idle on Network |
| | | S/S | O | Walks off train | Idle | Yes | Yes | End user device idle on Network |
| | | S/S | C | On platform | Idle | Yes | Yes | End user device idle on Network |
| Typical 7 | | S/S | C | On train | In call/session | Yes | Yes | End user device in service on Train System |
| | | S/S | O | On train (by open doors) | In call/session | Yes | Yes | End user device remains in service on Train System ie. does not change to in Service on Network |
| | | S/S | C | On train | In call/session | Yes | Yes | End user device in service on Train System |

FIG. 2B

| Use Case | | Train location | Train doors | End user location | End user device | Rest of network coverage available to end user? | On train system coverage available to end user? | Desired Outcome |
|---|---|---|---|---|---|---|---|---|
| Typical 8 | | S/S | C | On train | In call/session | Yes | Yes | End user device in service on Train System |
| | | S/S | O | On train (by open doors) | In call/session | Yes | Yes | End user device remains in service on Train System ie. does not change to in service on Network |
| | | S/S | O | Walks off train | In call/session | Yes | Yes | End user device remains in service on Train System but hands over to Network so in service on Network |
| | | S/S | C | On platform | In call/session | Yes | Yes | End user device in service on Network |
| Typical 9 | | M/O | C | On train | Idle | Yes | Yes | End user device idle on Train System |
| | | M/O | C | On train | In call/session | Yes | Yes | End user device in service on Train System |
| Typical 10 | | M/O | C | On train | Idle | Yes | Yes | End user device idle on Train System |
| | | M/O | C | On train | In call/session | Yes | Yes | End user device in service on Train System |

FIG. 2C

| Train location | Train doors | End user location | End user device | Rest of network coverage available to end user? | On train system coverage available to end user? | Desired Outcome |
|---|---|---|---|---|---|---|
| S/O | O | On train | Idle | Yes | Yes | End user device idle on Train System |
| S/O | O | On train | In call/session | Yes | Yes | End user device in service on Train System |
| S/O | O | Off train | Idle | Yes | Yes | End user device idle on Network |
| S/O | O | Off train | In call/session | Yes | Yes | End user device in service on Network |
| S/O | O | Off train | Idle | No | Yes | End user device idle on Train System |
| S/O | O | Off train | In call/session | No | Yes | End user device in service on Train System |

FIG. 2D

APPARATUS AND METHOD FOR HANDOVER FOR BASE STATIONS WITH CELLULAR BACKHAUL

CROSS-REFERENCE RELATED TO PRIORITY APPLICATIONS

This application claims the priority to G.B. Patent Application No. 1408863.7, entitled "HANDOVER FOR BASE STATIONS WITH CELLULAR BACKHAUL," filed on May 19, 2014, which is hereby incorporated by reference in its entirety.

BACKGROUND OF THE INVENTION

Field of the Invention

The invention concerns a method for controlling the management of handover at a base station in a cellular network, a handover controller and a network entity of a cellular network.

Description of the Related Art

Cellular networks have conventionally been designed and planned for macro cells, which are cells (which may be considered the area covered by a single base station) covering a wide geographical area that is generally fixed. However, more recent cellular network architectures have developed different types of cell, in particular cells with quite different sizes of geographical coverage area.

SUMMARY OF THE INVENTION

Against this background and in a first aspect, there is provided a method for controlling the management of handover at a first base station in a cellular network. A separate, provisioning base station of the cellular network provides the first base station with a radio backhaul interface to a core network part of the cellular network. The method comprises: communicating handover status information to the first base station, the information being based on a handover status for the provisioning base station.

This technique allows the first base station to be informed of a handover status, such as information on one or more neighbour base stations in a simplified and efficient way. The handover status information preferably comprises one or both of: information on one or more neighbour base stations, which may include neighbour relations (the list of other base stations to which a User Equipment, UE, can be handed over); and a handover signalling area (such as a location area and/or routing area).

The first base station is provided with a backhaul interface to the core network via a cellular link to another base station, which is referred to as a provisioning base station herein. The provisioning base station is preferably a macro base station, but it can be another form of base station (with a smaller coverage area size), but advantageously having a fixed location. The first base station is provided with a handover status information (preferably in the form of a neighbour relations list or table), which is based on the neighbour base stations of the provisioning base station. Typically, the first base station is simply informed about some (although normally all) of the neighbour base stations for the provisioning base station. Since the first base station uses the provisioning base station for its backhaul link, this is especially advantageous.

The first base station is preferably configured for operation whilst mobile. In other words, the first base station need not have a fixed location, such as when the first base station is located on a vehicle (which may be a train, coach, lorry, truck, bus, tram, van, car or other form of public or private transportation). For example, the first base station may be a mobile Femtocell (mFC). When the first base station's location can change, the first base station may have difficulty identifying neighbour relations. The usefulness of such neighbour relations may also be limited, especially when the first base station is moving. However, there will be situations when the first base station is not moving or moving in such a way (for instance, slowly or within a small geographical area), that handover of a UE from or to the first base station may be possible. Then, it is desirable for the first base station to have updated neighbour relations information. The approach described herein is an effective and efficient way to do this.

In some cases, the first base station acts as a UE to the provisioning base station. In other cases, the base station acts as a UE to another network entity, which may be a gateway entity. For instance this may be used to provide a single cellular backhaul link to the provisioning base station for multiple base stations (which may be on board a vehicle such as a train). In all cases, the first base station therefore acts as a UE (for its backhaul link) whilst also acting as a base station to other UEs. In the preferred embodiment, the first base station acts as a base station and as a UE on the same cellular network. However, it is possible for the first base station to act as a base station on a first cellular network and to act as a UE on a second (different) cellular network. The first and second cellular networks may differ in operator, Radio Access Technology (RAT) or other characteristics.

The method may further comprise: sending a request for the handover status information from the first base station to a management part of the cellular network. The management part may comprise an Operations and Management (O&M) system, for instance. The management part of the cellular network is optionally logically separate, physically separate or both in comparison with the core network. In some embodiments, it may be part of the core network though.

It is advantageous for the core network, management part or both to identify the provisioning base station from the request. However, the first base station may not know a suitable identifier for the provisioning base station that the core network, management part or both can interpret. To address this point (or for other reasons), the request advantageously comprises a predetermined identifier. The predetermined identifier is typically not specific to the provisioning base station and it can simply be a known value that is used to indicate the need to insert the correct identifier. In one approach, the method further comprises: detecting the request from the first base station to the management part of the cellular network, at the provisioning base station. Then, the method may further comprise: communicating a modified request from the provisioning base station to the core network, the modified request replacing the predetermined identifier in the request by an identifier associated with the provisioning base station. This approach may be advantageous particularly where the provisioning base station communicates directly with the first base station to provide the backhaul interface. In another approach, a network entity (such as a gateway, as discussed above) further provides the radio backhaul interface by facilitating communications between the first base station and the provisioning base station. Then, the method preferably further comprise: detecting the request from the first base station to the core network, at the network entity. More preferably, the method further comprises: communicating a modified request from the provisioning base station to the core network, the modified request replacing the predetermined identifier in the request by an identifier associated with the network entity. In preferred embodiments, the method of either approach may further comprise: receiving the modified request at the management part of the cellular network. In either approach, the step of communicating handover status information to the first base station beneficially comprises: identifying the provisioning base station from the modified request. Then, the method may further comprise: establishing the handover status information based on the identified provisioning base station. For instance, the handover status information for the first base station could be identical to handover status information for the provisioning base station (such as a neighbour relations list), as discussed above.

In some cases (as mentioned), a network entity further provides the radio backhaul interface by facilitating communications between the first base station and the provisioning base station. Then, the method may further comprise: receiving the request at the management part of the cellular network; and identifying the provisioning base station based on a mapping between the first base station and the network entity, in response to the request. Advantageously, the method further comprises: establishing the handover status information based on the identified provisioning base station. Thus, the management part of the cellular network may store a mapping (a table, list or other data structure) to associate each first base station with a provisioning base station. Thus, there is no need for a request to the management part from the first base station to be modified in communication through the network.

In other cases, the request from the first base station comprises an indication of the provisioning base station. Then, the method may further comprise: receiving the request at the management part of the cellular network. Preferably, the method further comprises: establishing the handover status information based on the provisioning base station indicated in the request.

The management part may request the information for the first base station from the provisioning base station. For example, the method may further comprise: receiving handover status information in respect of the provisioning base station from the provisioning base station. Then, the step of communicating handover status information to the first base station may comprise communicating the handover status information received from the provisioning base station to the first base station.

In the preferred embodiment, the step of communicating information to the first base station is not made unless there is a need. In particular, the method may further comprise: identifying a condition indicative that a handover is likely. Then, the step of communicating information may be made in response to the identification. A condition indicative that a handover is likely may arise based on a range of different parameters, such as time, location, network load. Additionally or alternatively, where the first base station is configured for operation whilst mobile (such as when it is a mFC) and the step of identifying preferably comprises determining a mobility parameter for the first base station. The mobility parameter advantageously relate to a change in location for the first base station.

In a second aspect, there is provided a method for controlling the management of handover at a first base station in a cellular network. The first base station is configured for operation whilst mobile. The method comprises: determining a mobility parameter for the first base station, the mobility parameter relating to a change in location for the first base station; and communicating handover status information to the first base station based on the determined mobility parameter. Alternatively, the step of communicating may be considered as identifying a handover status (such as neighbour relations) at the first base station in response to the mobility parameter of the first base station meeting predetermined criteria. In either case, this approach allows neighbour relations for the mobile, first base station to be established only when handover is likely and this will be depend on the mobility parameter for the first base station, especially when the mobility parameter indicates a stationary condition (which need not strictly be stationary, as discussed below) for the first base station.

In either aspect, there are a number of optional features relating to the mobile, first base station. For instance, the first base station may be on board a vehicle. Then, the step of determining a mobility parameter for the first base station optionally comprises identifying an open or closed state for at least one door of the vehicle. This may indicate a stationary state. Additionally or alternatively, the mobility parameter for the first base station may relate to one or both of a physical velocity and a location for the first base station. Ways to determine and use the mobility parameter are discussed below (with reference to the first ancillary aspect). These are also applicable to this aspect.

The one or more neighbour base stations optionally use a different Radio Access Technology (RAT) than the first base station. Thus, the neighbour relations may be configured for inter-RAT handover. However, intra-RAT handover may additionally or alternatively be implemented. For example, UMTS handover may also desirably use neighbour relations. Communicating neighbour relations in this form avoids the need for the first base station to determine its own neighbour relations, by scanning or querying a UE. This may use up excessive resources unnecessarily.

In a further aspect, there is provided a computer program, configured to operate in accordance with any method described herein when operated by a processor.

Another aspect provides a handover controller for controlling the management of handover at a first base station in a cellular network. A separate, provisioning base station of the cellular network provides the first base station with a radio backhaul interface to a core network part of the cellular network. The handover controller comprises: a radio interface, configured to communicate handover status information to the first base station, the information being based on neighbour base stations for the provisioning base station.

A yet further aspect provides a handover controller for controlling the management of handover at a first base station in a cellular network. The first base station being configured for operation whilst mobile. The method comprises: determining logic, configured to determine a mobility parameter for the first base station, the mobility parameter relating to a change in location for the first base station; and a radio interface, arranged to communicate handover status information to the first base station based on the determined mobility parameter.

It will be understood that apparatus features configured to implement any of the method features described herein are also optionally provided in conjunction with the handover controller of either aspect or a combination thereof.

A network entity of a cellular network, such as a base station, is further provided. The network entity comprises the handover controller of either aspect (or a combination thereof), as described herein.

The combination of any specific apparatus and/or method features described herein is also provided, even if that combination is not explicitly discussed.

Ancillary aspects of the invention (which may be combined with the above aspects) are also now described.

In a first ancillary aspect, there is provided a method for controlling handover of a User Equipment (UE) between first and second base stations in a cellular network, the first base station being configured for operation whilst mobile, the method comprising: determining a mobility parameter for the first base station, the mobility parameter relating to a (preferably, current) change in location for the first base station; and configuring the first base station to permit or prevent handover of the UE between the first and second base stations based on the mobility parameter of the first base station. The mobility parameter is preferably dynamic, but may be static in embodiments.

In the context of mobile base stations (such as an mFC), the decision as to whether a handover is sensible may depend not only on the UE and its movements but also on the mobility of the cell. When a UE will not board the vehicle, he will be handed back to macro network as soon as the vehicle passes by, such that the overhead of two handover was created without any benefit. This will be referred to as undesired handover.

Two major examples can be used to illustrate this scenario.

a) A train or car passes a premises along the track or road. The customer in the premises perceives the vehicle cell as the best server and hands over to this cell. After some seconds, he is handed back since the vehicle has passed by. Undesired signalling overhead is created and the connection interruption during the handover process might reduce the user experience.

b) A train stops in the train station. The doors open and the vehicle cell is perceived as the best server on the platform. Although only some users waiting on the platform will enter the train, while the others are waiting for the next train, all UEs will try to attach to the train cell. This leads (besides the signalling overhead just discussed) to congestion of the femtocell backhaul and reduces user experience for all users, as well on the train as on the platform.

Making use of a mobility parameter of the mobile (first) base station in determining whether to handover the UE therefore provides significant advantages. The mobility parameter typically indicates if the mobile base station is stationary (or effectively stationary), in which case there is a risk that UEs that are not moving together with the mobile base station (for example, because the mobile base station is on board a vehicle and the UEs are not on board the same vehicle) will become attached to the mobile base station and therefore quickly lose service when the mobile base station moves again. In view of this risk, handover of a UE that is not yet attached to the mobile station might be prevented. Additionally or alternatively, the mobility parameter may indicate if the mobile base station is moving (or significantly moving), in which case there is a risk that UEs that are moving together with the mobile base station (for example, because the UEs are on board the same vehicle as the mobile base station) will start handover to a macro cell and therefore quickly lose service or be provided a sub-optimal service especially when the UE moves away from that macro cell. In view of this risk, handover of a UE that is attached to the mobile station might be prevented. In contrast, handover of a UE that is not yet attached to the mobile base station may be permitted when the mobile base station is in the moving state, since the length of time needed for handover means that the likelihood of such a UE not moving together with the mobile base station is small.

The step of configuring the first base station may be based on the mobility parameter of the first base station and one or more than one other parameter. The one or more than one other parameter may be a parameter associated with the UE. For example, the step of configuring may comprise determining at least one parameter associated with the UE. Then, the step of configuring may further comprise establishing whether to permit or prevent the UE from handover on the basis of the parameter associated with the UE. The at least one parameter associated with the UE may indicate a base station to which the UE is attached, for example.

As noted above, the mobility parameter may indicate that the location for the first base station is stationary (stationary state) or that the location for the first base station is moving (moving state). The stationary state need not correspond with strict lack of movement; movement at a small speed, velocity or acceleration may be considered the stationary state in some embodiments. Similarly, the moving state need not correspond with strict movement; movement at a small speed may not be considered the moving state in some embodiments. Typically, there is no third mobility state, such that the first base station will either be in the stationary state or the moving state.

The step of configuring the first base station will be different depending on the mobility parameter. For instance, the mobility parameter may indicate that the location for the first base station is stationary. Moreover, the at least one parameter associated with the UE may indicate a base station to which the UE is attached. Then, the step of configuring the first base station advantageously comprises one or (preferably) both of: if the UE is attached to the first base station, permitting handover of the UE from the first base station to the second base station; and if the UE is attached to the second base station, preventing handover of the UE from the second base station to the first base station. Thus, if the UE is already attached to the first base station, it may be permitted to handover to another base station (such as a macro cell). However, if the UE is attached to another base station, it is prevented from handover to the mobile base station.

Alternatively, the mobility parameter may indicate that the location for the first base station is moving. The at least one parameter associated with the UE may then indicate a base station to which the UE is attached. Then, the step of configuring the first base station advantageously comprises one or (preferably) both of: if the UE is attached to the first base station, preventing handover of the UE from the first base station to the second base station; and if the UE is attached to the second base station, permitting handover of the UE from the second base station to the first base station. When the first base station is in the moving state, it is preferable to avoid any UE attached to the first base station from handover, especially to a macro cell, for the reasons explained above. If the UE is not attached to the first base station, it may be permitted to handover to the first base station, especially if the first base station is considered the best target cell for handover, because it is then likely that the UE is moving with the first base station (such as on board the same vehicle) and will therefore be served best by the first base station.

In such cases, the at least one parameter associated with the UE may further indicate whether the first base station can provide a minimum Quality of Service (QoS) level. Additionally or alternatively, the at least one parameter associated with the UE may further indicate which of the first and second base stations is expected to provide a higher link quality. This may be a useful further parameter in determining handover control.

There may be a number of different ways to determine the mobility parameter. For example, the first base station may be on board a vehicle and the step of determining a mobility parameter for the first base station may then comprise identifying an open or closed state for at least one door of the vehicle. In another approach, the mobility parameter for the first base station may relate to a location for the first base station. For instance, the first base station may comprise a location determining system, for example a Global Positioning System (GPS) or Global Navigation Satellite System (GNSS). This may indicate whether the first base station is in a moving state or a stationary state. Additionally or alternatively, this may indicate whether the vehicle is near a known stopping point location (train station, bus stop, or other location associated with the vehicle or a UE on board the vehicle, such as a home address). This may be achieved by determining whether the distance from the known stopping point location is no greater than a predetermined threshold. This distance may be a straight line distance or it may be a distance along one or more predetermined routes (such as a train line or road).

Preferably, the mobility parameter for the first base station may relate to one or more of: a speed; physical velocity; and acceleration for the first base station. In embodiments, the state of stationary need not apply strictly to the case where the speed (or velocity, that is speed and direction, or acceleration) of physical movement of the first base station is zero. For example, the state of stationary may be established when the speed of movement of the first base station is no greater than a first predetermined threshold. Additionally or alternatively, the state of moving may be established when the speed of movement of the first base station is at least or greater than a second predetermined threshold. In some cases, the first predetermined threshold and the second predetermined threshold may be the same, although this need not be the case in all embodiments. Transition between the stationary state and the moving state may optionally involve hysteresis, such that the speed at which the transition from stationary to moving occurs may be different from the speed at which the transition from moving to stationary occurs.

In the preferred embodiment, the first base station is on board a vehicle, such as a car, bus, train, tram or other transportation vehicle. Preferably, the vehicle is a mass-transportation vehicle (such as for use by the public). In embodiments, the first base station is a mobile femtocell. Other types of base station that can be operated from a moving location may also be used. The second base station may be a macro cell in embodiments, although it could also be configured for mobile operation in other scenarios.

Configuring the first base station to permit or prevent handover of the UE between the first and second base stations may be carried out in a number of different ways. These approaches are not necessarily mutually exclusive and, in some cases, may be combined.

A first approach may comprise setting one or more of: a hysteresis parameter; a time-to-trigger parameter; a cell reselection priority for the first base station for controlling handover of the UE. Changing one or more than one of these parameters may affect whether the UE hands over or not.

In a second approach, the configuring comprises: receiving a handover request message from the second base station at the first base station; and sending a non-acknowledgement message from the first base station to the second base station. This configures the first base station to prevent handover of the UE between the first and second base stations, by means of the non-acknowledgement (NACK) message.

A third approach comprises sending a configuration message from the first base station to an operations system of the cellular network, in order to configure the operations system to permit or prevent handover of the UE. Thus, the first base station is configured to instruct the operations system, preferably an Operations and Management (O&M) system to control the handover and permit or prevent handover of the UE according to the settings made by the first base station.

In a fourth approach, the configuring comprises setting the first base station to operate with a closed subscriber group. Preferably, the closed subscriber group is set with members comprising each UE that was attached to the first base station prior to the step of setting the first base station to operate with a closed subscriber group. This can therefore prevent the UE from being handed over from the second base station to the first base station. This may be applicable when the first base station is stationary, for example and avoids new UEs from attaching to the first base station.

A computer program, configured to operate in accordance with any method in accordance with the first ancillary aspect when operated by a processor is also provided.

There is further provided a handover controller for managing handover of a User Equipment (UE) between first and second base stations in a cellular network. The first base station is configured for operation whilst mobile. The handover controller comprises: a mobility input, configured to determine a mobility parameter for the first base station, the mobility parameter relating to a change in location for the first base station; and a configuration output, arranged to control the first base station to permit or prevent handover of the UE between the first and second base stations based on the mobility parameter of the first base station.

It will be understood that apparatus features configured to implement any of the method features described with respect to the first ancillary aspect are also optionally provided in conjunction with the handover controller.

A network entity of a cellular network, such as a base station, is further provided. The network entity comprises the handover controller of the first ancillary aspect.

In a second ancillary aspect, there is provided a method for controlling handover of a User Equipment (UE) between a first base station of a first type and a second base station of a second, different type in a cellular network. The method comprises configuring at least one handover parameter at one or more of: the UE; the first base station; and the second base station, on the basis of the first type and the second type. The first and second types are typically technology types.

A base station may be a Base Transceiver Station (BTS), a NodeB, an eNodeB or other form of base station or cell for a specific cellular network architecture. This technique allows the handover parameters to be tailored to specific types of base station. The type of base station may affect its function, one or more modes of operation or a combination thereof. Changing the handover parameters according to the two base stations' types can be a straightforward way to adjust handover based on these characteristics.

The step of configuring can be based on a simple comparison of the base stations' types, for instance whether they are the same or different. In some embodiments, the configuring can be based on the specific type of both base stations, rather than just a comparison of type. It should be noted that a base station is optionally categorised by more than one type. Then, the step of configuring may be based on a respective one such type of each base station or a respective combination of a plurality of types for each base station. With respect to whatever function and/or parameter the first type is defined, the second type should be defined according to the same function and/or parameter. The first and second base stations may use the same Radio Access Technology (RAT), which is referred to as Intra-RAT handover. Alternatively, the first and second base stations may use different RATs (Inter-RAT handover) in some embodiments.

In this context, the type of base station relates to a fundamental feature of the base station. An example of a base station type may include its intended coverage area, which may define base station type to include: macro; micro; nano; pico; femto. Additionally or alternatively, the first and second types may relate to a capability of the base station to operate when mobile. For instance, one of the base stations may be a mobile Femtocell (mFC). In other scenarios, the type of base station may include its RAT.

In embodiments, the step of configuring the at least one handover parameter is further based on a contextual parameter of one or both of: the first base station; and the second base station. Multiple contextual parameters (for either the same or different base stations) may be used and a comparison of the contextual parameters may also be employed. For example where a base station is configured for operation while mobile, the contextual parameter may indicate: whether the base station is moving or not; whether it is in a stationary state or a moving state (which may be different from whether it is actually moving, as discussed below); and a mobility parameter for the base station (such as a velocity, acceleration, maximum velocity, location). The contextual parameter may also relate to other features of the base station, such as technology features (ability to use specific technologies, such as VoIP or MIMO, or specific technological parameters), location or traffic load. The contextual parameter or parameters may be used in addition to type.

In an aspect, the contextual parameter or parameters may be used as an alternative to type. Then, there may be provided a method for controlling handover of a UE between first and second base stations in a cellular network. The method comprises configuring at least one handover parameter at one or more of: the UE; the first base station; and the second base station, on the basis of a contextual parameter of one or both of: the first base station; and the second base station. The features discussed above are also relevant to this aspect. Either aspect may be combined with optional features as discussed below.

Preferably, the method further comprises: determining to handover the UE between the first base station and the second base station based on the at least one handover parameter. Thus, the handover parameter may be used by one or more of: the UE; the first base station; and the second base station in order to effect a handover decision. In one embodiment, the step of determining may comprise: comparing a first link quality and a second link quality using the at least one handover parameter. The first link quality may relate to a link between the UE and the first base station and the second link quality may relate to a link between the UE and the second base station. The first and second link qualities may be compared against each other, optionally with a hysteresis parameter being applied so that the link quality associated with the target (new) base station exceeds the link quality associated with the currently serving base station by at least the hysteresis parameter value. Optionally, an offset may be applied in addition, so that the link quality associated with the target base station must exceed the link quality associated with the currently serving base station by at least the sum of the hysteresis parameter value and an offset value. Additionally or alternatively, the first link quality may be compared with a first threshold and the second link quality may be compared with a second threshold. The first and second thresholds may be the same or different. In embodiments, the handover parameter may relate to the suitability of the target base station for a specific service or user.

In the preferred embodiment, the at least one handover parameter comprises one or more of: an offset parameter; hysteresis parameter; and a threshold parameter.

In some embodiments, the step of configuring the at least one handover parameter comprises: determining the at least one handover parameter at a network entity of the cellular network on the basis of the first type and the second type. Then, the method may further comprise: communicating the determined at least one handover parameter from the first base station or the second base station to the UE. This allows the network to control the handover parameters applied by the UE.

Optionally, the step of configuring the at least one handover parameter comprises: adjusting the at least one handover parameter based on a handover performance characteristic. For example, the handover performance characteristic may comprise a number or rate of (successfully and/or unsuccessfully) completed handovers. It may not be desirable to use a base station with a large number (at least or greater than a predefined threshold) of unsuccessfully completed handovers for handover. The at least one handover parameter can therefore be iteratively adjusted based on statistical learning to improve quality.

In order to set the at least one handover parameter based on the first and second type, the method advantageously comprises: establishing one or both of: the first type; and the second type. The step of establishing can be based on a number of different approaches. In a first approach, the step of establishing is on the basis of a base station identifier for the first base station, second base station or both respectively. The base station identifier optionally comprises an existing identifier, for example one or more of: a physical cell identifier (PCI); and a scrambling code or set of scrambling codes. In a second approach, the step of establishing is on the basis of signalling from the first base station, second base station or both respectively. This signalling may be in addition to the base station identifier noted above, which need not be used for communicating the base station type. In a third approach, the step of establishing is by receiving data from a network management system, such as an Operations and Management (O&M) system. This data may comprise one or more of: the type for the respective base station; an indication as to whether a base station is of a specific type; and a list of base stations of a specific type.

In the preferred embodiment, one of the base stations (for the purposes of illustration, the first base station will be used, but the second base station could additionally or alternatively be considered) is configured to operate when mobile (for example, as a mobile Femtocell). In this case, the method may further comprise: determining that the first base station has a stationary state. In some embodiments, the step of determining that the first base station has a stationary state may comprise determining that the first base station has changed from a mobile state to a stationary state. In any case, the method may further comprise: effecting an update of the at least one handover parameter with respect to the first base station at one or both of: the UE; and the second base station, in response to the determination of the stationary state (or change to the stationary state). The step of effecting an update beneficially comprises initiating a neighbour relations update at the first base station. By initiating a neighbour relations update, the first base station may cause the second base station (optionally in addition or alternatively, the UE) to be updated with the handover parameters suitable for operation with the first base station.

A computer program, configured to operate in accordance with any method according to the second ancillary aspect when operated by a processor is also provided.

There is also provided a handover controller for managing handover of a User Equipment (UE) between a first base station of a first type and a second base station of a second, different type in a cellular network. The handover controller comprises: a configuration output, arranged to configure at least one handover parameter at one or more of: the UE; the first base station; and the second base station, on the basis of the first type and the second type.

It will be understood that apparatus features configured to implement any of the method features of the first ancillary aspect are also optionally provided in conjunction with the handover controller.

A network entity of a cellular network, such as a base station, is further provided. The network entity comprises the handover controller of the second ancillary aspect.

BRIEF DESCRIPTION OF THE DRAWINGS

The invention may be put into practice in various ways, a number of which will now be described by way of example only and with reference to the accompanying drawings in which:

FIGS. 2A, 2B, 2C and 2D show a table of possible scenarios in relation to the embodiment shown in FIG. 1;

DETAILED DESCRIPTION OF THE PREFERRED EMBODIMENT

Figure 1:
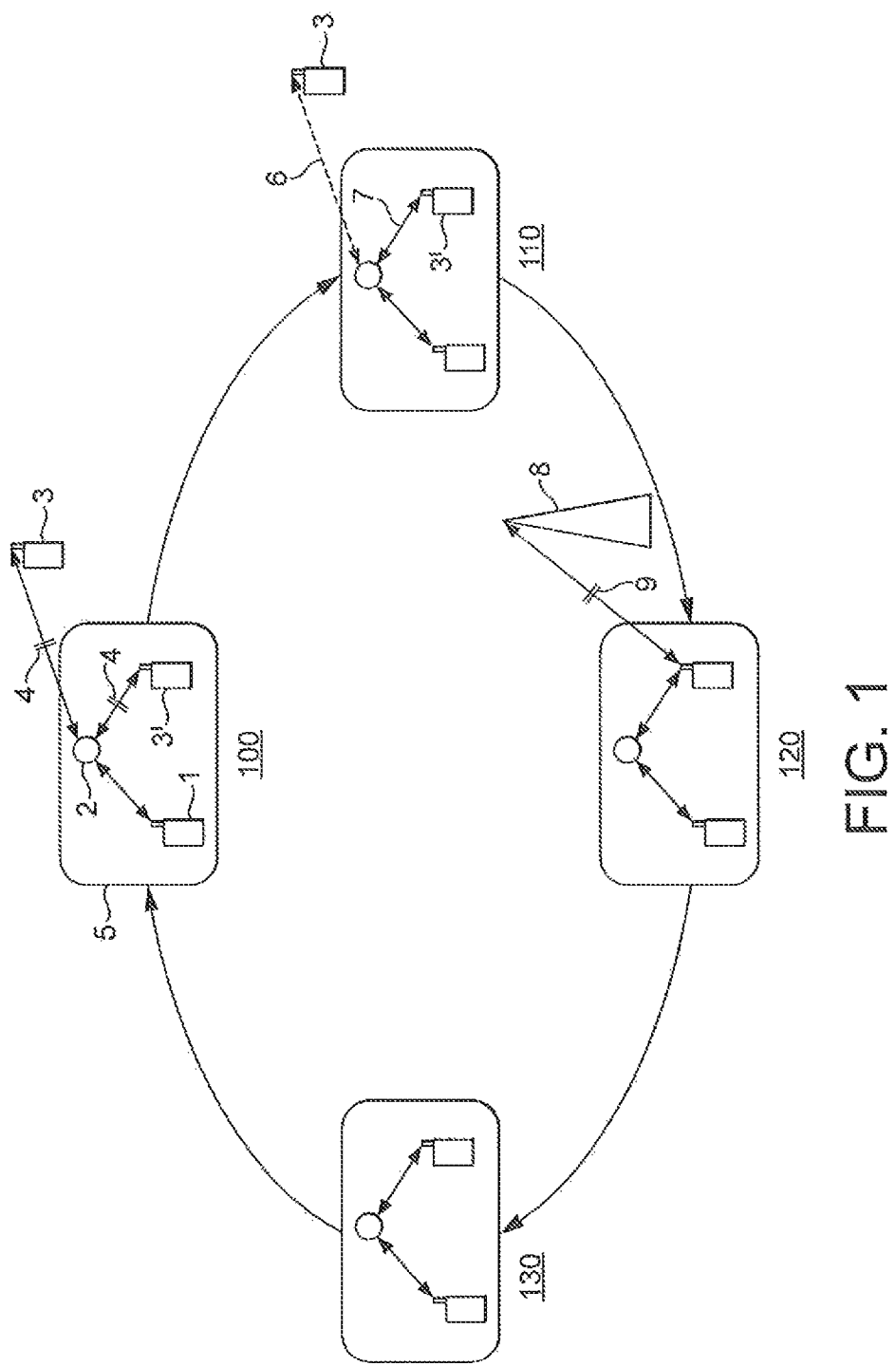
FIG. 1 is a schematic diagram showing the operation of a first embodiment of the invention, relating to mobility dependent handover.

The development of the femtocell may be significant. In the terms used by the Third Generation Partnership Project (3GPP), these are referred to as Home eNodeB (HeNB). These are low power and small coverage base stations, which are widely used to offload traffic from the macro network. They are often deployed indoors, either by a mobile network operator (MNO) or third parties, and are connected to the core network via a wired broadband connection, such as a Digital Subscriber Line (DSL). Due to their utility, femtocells have been part of the 3GPP Long Term Evolution (LTE) standardisation process from its inception and have even been added to the earlier developed Universal Mobile Telecommunication System (UMTS) architecture.

Since their deployment is not necessarily in the control of an MNO, small cells (such as femtocells) desirably provide the possibility of self-configuration, as well as remote-control and self-optimization to enable a "plug-and-play" installation by a network user. Algorithms to effect such functionality may include: selecting a physical cell identifier (PCI); determining neighbour relations (NR) in order to enable handover; allocating suitable transmission resources; obtaining location information (such as for emergency calls); and finding appropriate transmission power setting. The surrounding radio-frequency (RF) situation is often a significant input to these processes and a sensing of the RF-environment may be carried out prior to their execution. This is called network listening mode (NLM), in which the femtocell behaves as UE and try to find its neighbours. The NLM occupies the reception capabilities of the femtocell and it is therefore carried out infrequently and usually in idle mode (for instance, once a day at about midnight). Also implemented are security checks that may lead to self-barring of the femtocell. For example, this may occur when the IP address changes, to prevent malfunctioning of the HeNB due to, for instance, the lack of control information.

The provision of cellular network coverage within vehicles, such as trains, buses or cars, may present more of a challenge than providing coverage indoor to buildings. Firstly, the penetration loss of the vehicle body (which can be very high due to its Faraday cage characteristics, for instance, in the order of 45 dB for modern trains) makes coverage within the vehicle weaker. Moreover, the velocity of the vehicle may make tasks likes handovers more demanding and may reduce the achievable throughput due to Doppler effect RF propagation conditions. One existing solution to such problems uses a repeater, which receives the signal outside the vehicle and re-transmits it in an amplified form inside. This only deals with the penetration loss of the vehicle body. Channel condition and handover issues still remain between the mobile terminal, called a User Equipment (UE) in 3GPP terminology, and the network. Another solution uses different backhaul technologies for providing a connection to the vehicle (which may include the use of cellular networks, satellites, IEEE WiMAX or proprietary solutions). The distribution within the vehicle is usually done by Wireless LAN, which normally provides data coverage but often not coverage for voice and other services that are more readily accessible through a cellular network.

As a result, the concept of a mobile femtocell (mFC) has more recently emerged. This is a low power cell for installation on a vehicle and fed by a wireless backhaul, for example using the existing macro cell network or an alternative dedicated network. Such solutions may be advantageous, but their implementation may yet cause further problems. A mFC may not readily be able to employ techniques in use for existing femtocells, especially in the case where the location of the mFC may vary greatly and/or when the mFC's location is changing rapidly. As the mFC location changes, so does the RF situation. Existing femtocell implementations show a lack of mobility support. This gives rise to a number of problems in taking a femtocell and deploying it for mobile use.

Existing approaches for determining control information, neighbour relations and other network configuration aspects at femtocells typically use real-time information, such as NLM described above. However, the RF situation may change too fast to rely on NLM for resource allocation in an mFC.

Another concern relates to handover (HO). Existing approaches for making the decision to pass the UE from a serving cell to a target cell use the metrics of the received signal power (RSRP) or quality (RSRQ) and a set of network parameters, for instance Hysteresis (Hys) or Time to trigger (TTT). When the RSRP of the target cell is greater than the RSRP of the serving cell by at least the value of Hys for a time duration of TTT, handover is initiated. Handover is a key issue in cellular network coverage, since the connection might drop if it is triggered too late. On the other hand, triggering handover too early due to, for instance, short signal variations (fading) which are common in mobile networks, causes unnecessary signalling overhead. Similar procedures as for handover apply to the cell selection or reselection procedure, which decides to which cell the UE attaches to be available for paging or be able to initiate a connection. Configuring the handover process and deciding when to trigger handover becomes especially complex in the context of an mFC, in view of the normally changing RF situation.

One approach for improving the handover performance of femtocells in a vehicle is described in WO-2011/020481. A "joint movement" of an mFC and a UE is detected. If the signal strength received at the UE from the mFC stays above a threshold for a certain time threshold, the condition of a "joint movement" is approved and the handover is initiated. This solution presents two major issues though. Firstly, it is not easy to define the time threshold. Moreover, the proposed methods to detect an mFC require changes to the signalling. Femtocells and/or base stations are required to announce the presence of mFCs in the system information and/or neighbouring list. The UE must then evaluate this information. This makes the process inefficient and difficult to implement in practice. Another existing approach is described in US-2013/0079003, which discusses a generic procedure for a femtocell to maintain a 'Neighbouring Cell List (NCL)' from a network entity.

It can therefore be seen that the use of base stations that are configured for operation at a mobile location, such as an mFC, presents a series of challenges in maintaining a user experience that is consistent with and of the same quality as that provided by the macro network. This should ideally be achieved without loss of efficiency or the requirement to make significant changes to the network configuration. It is especially desirable that handover between the mFC and the macro network operates seamlessly and without unnecessarily dropped connections. Whilst these issues are especially of concern to mobile base stations, it will also be appreciated that some of them may equally apply to other types of cell, for example those using a cellular network backhaul.

An approach for providing handover between an mFC (or other base station configured for mobile operation, such as a base station with a cellular backhaul) and the macro network can be divided into three separate determinations: (1) when handover may take place; (2) the parameters to be used for handover; and (3) how to set up neighbour relations to allow handover to take place. The solution provided by the disclosure all three of these parts. These will now be discussed separately below, to improve the clarity of their explanation. Nevertheless, it will also be understood that the three parts may operate independently from one another and the solution may be based on only one or two of the parts as well as the combination of all three parts. Whilst the non-macro cell is referred to below as an mFC, this is by way of example only. The skilled person will understand that other types of non-macro cell may be employed instead.

Mobility Dependent Handover

In its simplest form, mobility dependent handover means that the decision as to when handover is allowed is based on the mobility of the mFC, for instance its location and/or speed. A mobility parameter is determined for the mFC, which relates to a change in location for the first base station. Then, the mFC is configured to permit or prevent handover of a UE between it and another base station (such as a macro base station) based on the mobility parameter. This may be effected by a handover controller (typically a software functionality, although it may be combined with hardware), having a mobility input for receiving the configuration parameter and a configuration output for indicating the handover permission. The handover controller is typically a part of the mFC or another base station, although it may be part of (or all of) another network entity.

Typically the mobility parameter indicates whether the mFC is in a stationary state or a moving state. These states may not directly correspond with the mFC velocity being zero or non-zero, although the stationary state would normally include the case where the mFC velocity (or acceleration) is zero. Possible mobility parameters will be discussed below.

Referring first to FIG. 1, there is shown a schematic diagram showing the operation of mobility dependent handover. This shows: a UE 1; and an mFC 2. Both the UE 1 and mFC 2 are on board a vehicle 5. These are shown in four different scenarios: a first scenario 100, when the vehicle 5 is stationary; a second scenario 110, when the vehicle 5 is starting to move; a third scenario 120, when the vehicle 5 is moving; and a fourth scenario 130, when the vehicle 5 is stopping.

In the first scenario 100, when the vehicle 5 is stationary, a first new UE 3 (not on board the vehicle 5) and a second new UE 3' (on board the vehicle 5) that are attached to a macro cell are also shown. In this first scenario 100, the mFC will reject all new connection attempts 4 by the UE 3 and UE 3' attached to a macro cell as long as the mFC is stationary. This applies to handover in connection mode or cell reselection in idle mode. The connection between UE 1 and mFC 2 is maintained as long as the UE 1 does not wish to handover to the macro cell.

This handover rejection may be employed by rejecting handover requests, reporting its mobility status to the Operation and Maintenance (O&M) system or switching the mFC 2 to a Closed Service Group (CSG). These options will now be discussed.

The rejection of incoming handover requests by the mFC can happen at two points. Before executing a handover, the original base station, called a source eNodeB (eNB), sends a handover request message to the target eNB. The target eNB has to send a handover acknowledgement (ACK) after processing this request in the admission control. When the vehicle 5 is stationary, the mFC 2 can answer every handover request with a non-acknowledgement (NACK) instead.

This can be cause a certain amount of signalling between a source eNB and the mFC 2 if it has to be conducted for every UE in range of the mFC. It should be kept in mind that this signalling has to be transferred over the radio backhaul link. However, the source eNB has to obtain the IP address of the mFC 2 before this signalling. To do this, it obtains the Cell Global Identity (CGI) for the mFC 2, for example through the UE, and requests the IP address from the O&M system. Consequently, by the mFC 2 reporting its status to the O&M system, the handover request might be blocked already there without the need for signalling.

Another approach to blocking handover may be based on CSG mode. The 3GPP standards provide the possibility for a base station to switch from open to CSG mode. In CSG mode, only registered users are allowed to attach to the femtocell. This mode can therefore be used while the vehicle is stationary. The list of admitted users may be updated with all currently attached UEs before switching to the CSG mode. This also would avoid cell reselection by UEs outside the vehicle 5. With the beginning of the movement (which will be discussed below), any UE that is not on board the vehicle 5 will lose connection to the mFC 2. To make sure they are not attached accidently in too early an admission phase, the admission phase after a certain velocity is reached, e.g. above walking speed to exclude pedestrians.

In the second scenario 110, when the vehicle 5 is starting to move, the first new UE 3 that is not on board the vehicle 5 will become distant from the vehicle 5. The signal strength of a link 6 between the non-boarded UE 3 and mFC 2 will weaken. In contrast, the second new UE 3' that is on board the vehicle 5 may wish to hand over to the mFC 2. Once the vehicle 5 begins movements, the mFC 2 allows UEs to attach or hand over to it. Thus, link 7 is established between the second new UE 3' and the mFC 2. Once the vehicle has started movement, that is its doors can be assumed to be closed and the vehicle body attenuation will be higher, the possibility decreases that the mFC 2 is perceived as a best server to UEs outside, such as first new UE 3. Moreover due to the movement of the mFC 2, the likelihood that the best server condition for non-boarded UEs such as first new UE 3 is fulfilled for sufficiently time decreases. This can be further reduced due to careful assignment of network parameters (such as the hysteresis parameter), which will be discussed further below.

While moving, no new passengers can board the vehicle (as least in theory). Nevertheless, passengers can switch on devices during movement so a short admission phase after departing may not be sufficient. But the fact that no passengers are able to leave the vehicle may also be exploited. This is discussed with reference to the third scenario 120, when the vehicle 5 is moving. During movement, there should be no need for handover or cell reselection from the vehicle cell to the macro network 8, at least as long as the vehicle is able to serve its users with sufficient Quality of Service (QoS). Hence, the mFC 2 may prevent handover of any UE away from the mFC 2 when the mFC 2 is moving, as shown by disabled link 9. However, this may be limited to the situation when the mFC 2 is able to serve its users adequately.

In practice, this may be achieved by disabling the best server condition for handover out of the mFC 2. The mFC 2 will ignore measurement reports from a UE that report a macro cell or another femtocell as a best server. Another way to achieve this disabling is to set the TTT to its highest suitable value (around 5 s in LTE). Due to the velocity of the vehicle 5, this reduces the likelihood that a handover will be triggered, but also augments the probability it fails, when it will be triggered anyway. Also cell reselection priority for the mFC can be set to the highest value to avoid idle UEs scanning for cells other than the mFC to which they are attached.

In the fourth scenario 130, when the vehicle 5 is stopping, the mFC 2 will block all connection attempts to the mFC again and also allows handover out of the mFC. This brings the position back to that of the first scenario 100.

Determining when the vehicle is stationary or moving may be done in a number of different ways. Velocity measurements can be obtained nowadays by a variety of different methods, amongst others GPS, network based measures, accelerometer or tachometer, when available (for example in the vehicle system). A stationary state need not only apply when the vehicle velocity is zero and may be when the velocity is below a threshold value (such as a pedestrian walking speed, as noted above). The determination as to whether the vehicle 5 doors are open or closed can also be used to determine the stationary status. In another approach, the distance of the vehicle 5 from global navigation satellite system (GNSS) coordinates of a place the vehicle is expected to stop (train station, bus stop, customer's home) can be used to determine the state.

Referring next to FIGS. 2A, 2B and 2C, there is shown a table of possible typical scenarios in relation to the embodiment shown in FIG. 1. The train location may be: stationary at a station (S/S); Stationary on track (S/O); or Moving on track (M/O). The train doors may be: Closed (C); or Open (O). The end user relates to the UE, who may be able to access the cellular network via a train gateway and/or via other cells (such as macro cells or other types of cells that are not the train gateway). The end user's device may be in an idle mode or in a call or session, requiring active service from the cellular network.

The scenarios are shown as groups of events that occur in sequence. For example, the first scenario ("Typical 1") relates to an idle UE, where the train is stationary at a station throughout. Moreover, the user remains on the platform throughout. Initially, the train doors are closed (for instance, because the train has just arrived at the platform). The doors then open (as indicated on the second line in the table) and the user is opposite the doors but does not board the train. The train doors close (as the train is about to depart, for instance) and the user remains outside the train. The other scenarios shown in FIGS. 2A to 2C can be understood similarly.

In FIG. 2D, there is shown a table of possible atypical scenarios in relation to the embodiment shown in FIG. 1. In this case, each line may represent an individual scenario or the lines may be grouped to indicate a scenario of changing conditions. The atypical cases may concern emergency situations, such as when the train is stuck on the track or in the case of a fire or other problem with the train (which may necessitate train evacuation, for example).

It will be noted that, when the end user is on the platform or walking off the train (such as in the first typical scenario discussed above), it is desirable that the user is provided coverage and/or service through other cells, not the train gateway, provided such coverage is available. However, if the end user is on the train or walking onto the train, it is desirable that the user is provided coverage and/or service through the train gateway. These may apply whatever the state of the user's device. Since knowledge of the end user's location with respect to the train and/or platform may not be perfect, the use of the train location, train door state or other parameter may be a suitable substitute as discussed, at least in typical scenarios. The skilled person will understand that these scenarios can readily be adapted for types of vehicles other than trains, as noted herein.

Handover Parameters and Signalling

To improve the handover from and to mFCs, it is desirable that the handover parameters are set appropriately. In fact, it can be recognised that this is a special case of intra-RAT handover between two base stations of different types. Thus, handover may be enhanced by the application of special parameters.

Figure 3:
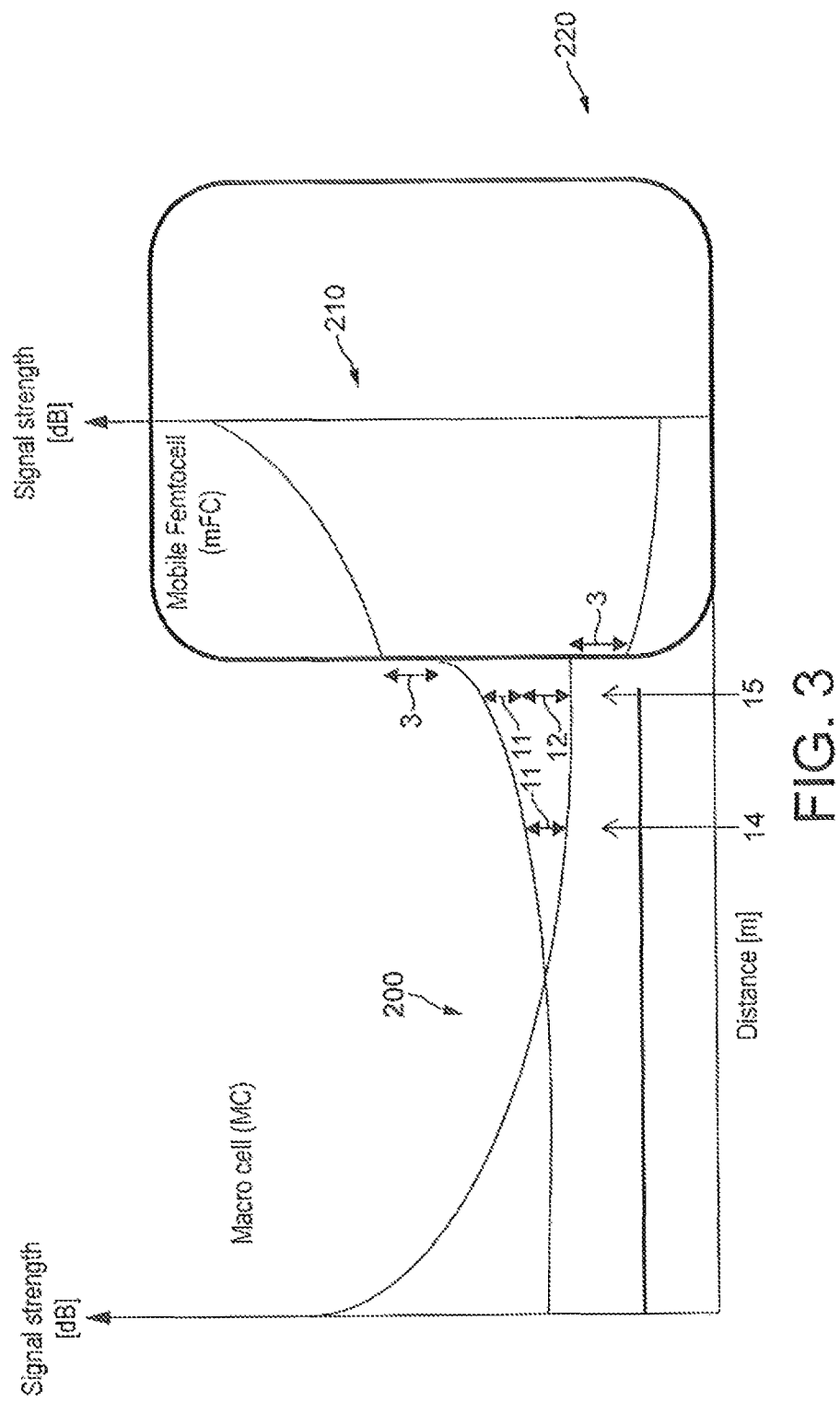
FIG. 3 depicts a typical variation of signal strength against distance for a UE moving between mFC and macro cell coverage in relation to a second embodiment of the invention.

Referring now to FIG. 3, there is depicted a typical variation of signal strength against distance for a UE moving between mFC and macro cell coverage. This will be used to illustrate an embodiment of the invention along these lines. As shown in FIG. 3, the signal strength experienced by a UE for a macro cell (MC) and a mobile femtocell (mFC) varies with distance from the two base stations. The signal strength received from the MC is shown by first line 200 and the signal strength received from the mFC is shown by second line 210. Moreover, the vehicle walls are indicated by box 220 and it will be seen that the MC signal strength 200 decreases significantly within the box 220, whilst the mFC signal strength 210 increases significantly within the box 220. This is indicated by the attenuation of the vehicle body 23.

A first handover parameter is, for example, a hysteresis parameter and this is shown with reference to hysteresis difference 21. The hysteresis parameter indicates how much the signal strength of the target cell must be greater than the signal strength of the source cell before a handover is triggered. This is done to avoid so called 'ping-pong' handover, that is when a UE switches back and forth between cells. In case of an mFC, the attenuation of the vehicle body 23 adds additional degradation to the signal strength curves, as discussed above. Nevertheless, there is no guarantee that this will be sufficient to avoid unnecessary handovers.

Handover parameters are usually set per-UE or per-cell. The handover parameters are communicated to each UE by control messaging. On the basis of the control information that the UE receives from the serving cell, it conducts measurements of one or more cells and reports these measurements back to the serving cell (such as an eNB). In addition to the hysteresis parameter, it is possible to apply a cell-specific offset between a pair of cells, which is indicated by offset 22. This specific offset will delay the handover between the two determined cells for which it is defined. Whereas with only hysteresis, the UE would handover between the MC and mFC at first distance 24, with the additional offset, handover occurs at second distance 25, which is much closer to the mFC. Offsets between cells are stored in a Neighbour Relations Table (NRT) and only applicable for two determined cells.

However, it may be assumed that no Neighbour Relation (NR) will be in place, in view of the difficulties in setting up NR for mFCs. Moreover, an NRT is size limited and each mFC would need to be added to every macro NRT they could possibly pass, in order for NR to be used to effect a cell-specific offset. Hence, a cell-specific offset cannot be stored within the NRT, in the conventional manner.

Instead, the cell-specific offsets are applied between stationary and mobile femtocells in general. The offset can be a default parameter for the handover from and to mobile femtocells. However, it is also possible for the O&M to keep different parameters for every mFC. These might be obtained through statistical learning while the mFC is in use. Also, although an offset is used in this particular as a specific parameter for handover between MCs and mFCs, it will be understood that other handover parameters can be adjusted. For example, the hysteresis parameter could be adjusted directly, other types of thresholds might be specified (such that handover is only possible if the target cell signal strength is above a certain threshold and/or is the serving cell signal strength is below a certain threshold). Whilst signal strength has been used as a parameter for determining handover (as would conventionally be the case), other link quality parameters may be used in addition or alternatively.

Thus, it may be understood that this approach controls intra-RAT handover of a UE between two base stations of differing types (one preferably being an mFC). At least one handover parameter is configured at one or more of: the UE; the first base station; and the second base station, on the basis of the types of base station. This may be effected by a handover controller (typically a software functionality, although it may be combined with hardware), having a configuration output for configuring the handover parameter. The handover controller is typically a part of the UE, the mFC or another base station, although it may be part of (or all of) another network entity.

Configuring Neighbour Relations

In order to allow handover away from the mFC, certain scenarios and/or Radio Access Technologies (RAT) will desirably (or sometimes necessarily) make use of neighbour relations (NR). In LTE for instance, the network must indicate to the UE at which frequencies it has to look for neighbour cells to conduct inter-RAT handover to UMTS or GSM. Furthermore, intra-RAT UMTS handover also requires NR.

There are many complexities involved with NR with respect to an mFC. For instance, as the mFC moves (during the journey of the vehicle), the neighbour list will change, since the macro cells are fixed in location. NR cannot therefore be configured statically. Continuous dynamic configuration, such as by NLM are slow and occupy transmission and/or reception resources of the mFC. Therefore they are carried out infrequently, which is unfeasible for the scenario where the mFC is mobile. Another complexity arises when the mFC uses the cellular network to provide its backhaul interface, since the mFC may not have a direct link to the core network.

Figure 4:
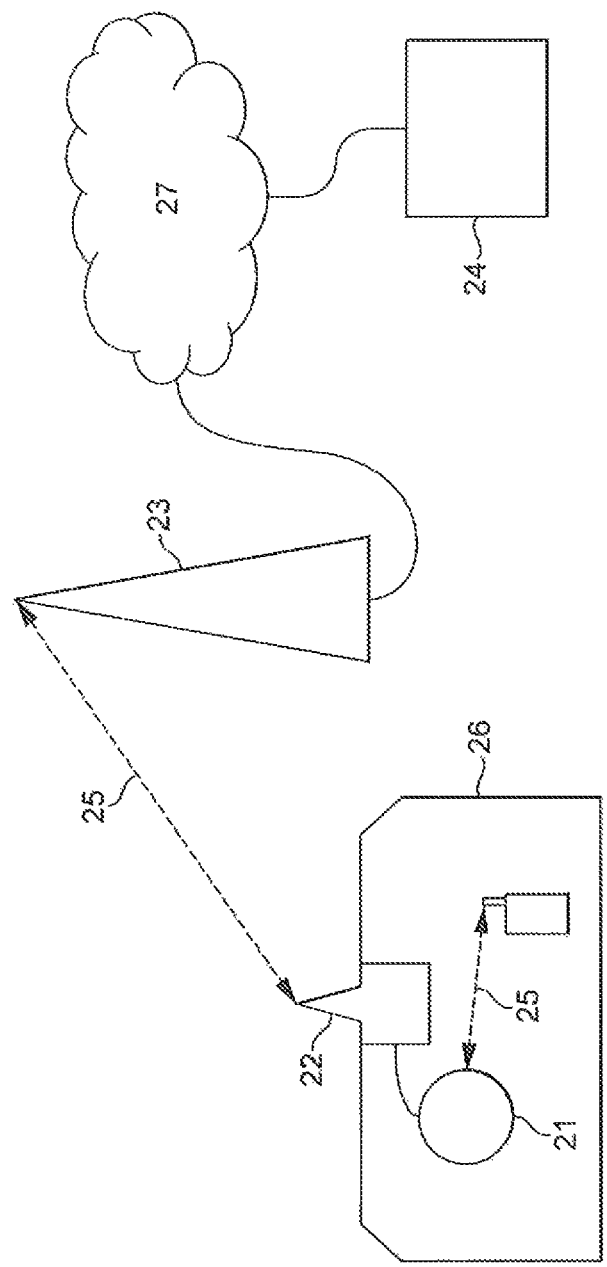
FIG. 4 schematically shows a mobile base station configuration with a backhaul provided by the cellular network.

Referring next to FIG. 4, there is schematically shown a mobile base station configuration with a backhaul provided by the cellular network. This configuration comprises: an mFC 21; a gateway system 22; a serving (preferably, macro) cell 23; a network management system 24; and a core network 27. The mFC 21 and gateway system 22 are on board a vehicle 26. Radio links 25 (discussed below) are also identified.

The gateway system 22 may allow one or more mFCs on board the vehicle 26 to access the cellular network via a single backhaul cellular radio link 25 to the serving cell 23. The gateway system 22 may therefore be seen as a UE of the serving cell 23, but is also a base station to the mFC 21. It will be understood that the gateway system 22 may be omitted in embodiments and the mFC 21 would then have a direct backhaul link to the serving cell 23. Since cellular network service is being provided by the serving cell 23, this may be termed a provisioning base station. This type of configuration is discussed in our co-pending patent application numbers GB1318818.0; GB1318819.8; GB1318822.2; and PCT/GB2014/050614 Additional intelligence can therefore be used to maintain functionality and efficiency of the mFC and provide NR at the same time. Neighbour relations should be obtained (only) when handovers are expected to take place. For an mFC, this is when passengers are entering or leaving the vehicle, that is when the vehicle has stopped.

So, obtaining NR will be triggered whilst stopping. It will be recognised that this approach is similar to the mobility dependent handover discussed above. However, it is not necessarily the case that the stationary state for allowing NR need be identical to the stationary state for allowing handover. The mechanism for establishing a mobility parameter for the mFC and/or identifying whether the mFC is in a stationary state, may be similar to that discussed above with reference to mobility dependent handover. For example, this may be done by getting close to global navigation satellite system (GNSS) coordinates of a place the vehicle is expected to stop (train station, bus stop, customers home) or by detecting that the velocity falls below a certain threshold (therefore vehicle data, accelerometer, tachometer or also GNSS data can be used).

In general, this can be understood as a method for controlling the management of handover at a base station that is configured for operation whilst mobile. A mobility parameter (relating to a change in its location) is determined for the base station and information is communicated on one or more neighbour base stations to the base station based on the determined mobility parameter. In other words, NR is effected based on the mobility parameter and particularly whether the base station is in a stationary state. This may be effected by a handover controller (typically a software functionality, although it may be combined with hardware), having determining logic for determining the mobility parameter and a radio interface for communicating the handover status information. The handover controller is typically a part of the mFC or another base station, although it may be part of (or all of) another network entity.

Once stopping is detected, the mFC 21 sends a request for neighbour relations to the network management system 24 (for example the O&M system). The network management system 24 has the ability to detect via which macro base station 23 the mFC 21 is being provided a backhaul link. This can be done by location data, by a specified signalling message or other means. For example, the neighbour request message can contain an identifier, for which the serving (macro) base station 23 can filter. When the macro base station detects such a message, it manipulates the identifier replacing it by its own identifier, which can then be used by the network management system 24 (typically the O&M system or other controlling network entity) to identify the serving (macro) base station 23.

Additionally or alternatively, the gateway system 22 can filter for this type of message instead. It then amends the neighbour request message in the same way as discussed above by replacing the identifier with its own identifier. The network then determines by which cell 23 the gateway system 22 (as a UE) is being served.

A third possibility (again which can be an alternative or used in addition) would be that the network has knowledge about the mapping between the mFC 21 and its gateway system 22. For example, when the mFC 21 first registers on the network, an entry in a look-up-table can be provided that is then used for determining the gateway system 22 (hierarchically above the mFC 21) every time that the mFC 21 requests NR.

A fourth possibility (again which can be an alternative or used in addition) is that mFC 21 and gateway system 22 are one integrated device (for instance, in smaller vehicles). This integrated device may be aware of its base station identity (as a mobile femtocell) as well as its UE identity within the network. In this case, the UE identifier of the integrated device can be placed directly in the neighbour request message.

Upon receipt of the neighbour request message (whether or not it has been modified in transit), the network management system 24 then retrieves the NR table from the serving (macro) base station 23 and forwards it to the requesting mFC 21. Once the mFC knows it neighbours, it then waits for the detection of a stationary state suitable for handover and then takes the means described above with reference to mobility dependent handover (such as blocking HO into the mFC 21 and/or allowing HO out of the mFC 21).

Figure 5:
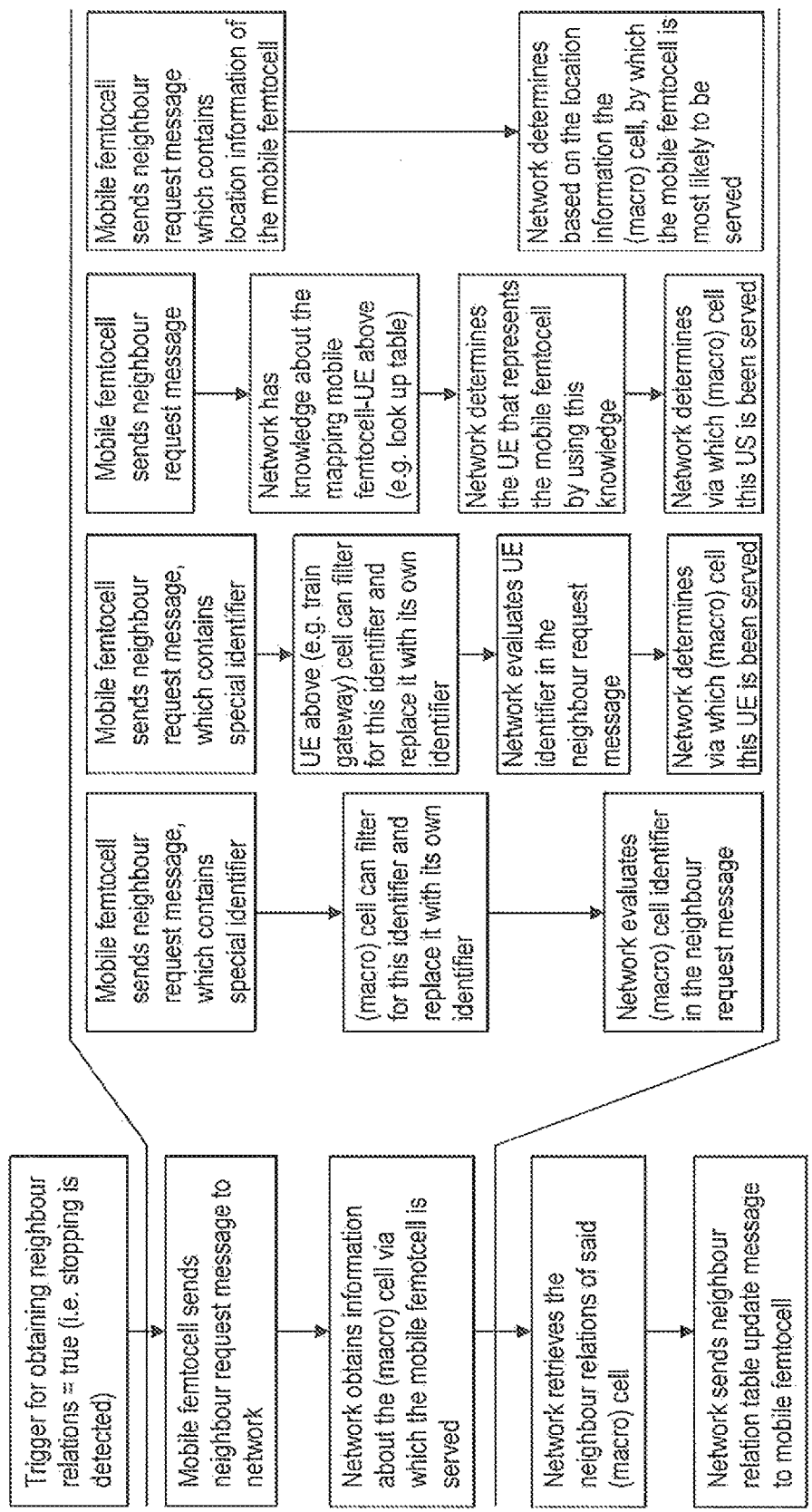
FIG. 5 illustrates flowcharts showing approaches for neighbour relations in connection with a third embodiment of the invention.

Referring now to FIG. 5, there are illustrated flowcharts showing approaches for neighbour relations in line with the above discussion. The left-hand flowchart shows the general approach and the four flowcharts to its right depict the four possibilities discussed above.

More generally, this may be considered a method for controlling the management of handover at a base station 21, in which a separate, provisioning base station 23 provides the base station with a radio backhaul interface to the core network 27. Information on one or more neighbour base stations (for example, NR), Location/Routing Area information or another handover-related status is communicated to the base station. This information is based on a corresponding handover status, for example neighbour base stations (such as an NRT) for the provisioning base station 23. This may be effected by a handover controller (typically a software functionality, although it may be combined with hardware), having a radio interface for communicating the information on one or more neighbour base stations. This handover controller is typically a part of (or the whole of) a network entity in the network management system 24, although it may be in a different part of the network.

Alternatives

Whilst specific embodiments have been discussed above, the skilled person will recognise that variations and substitutions may be made. For example, combinations of the above techniques may be implemented. Also, the techniques have been described in particular for 3GPP-based systems, but it will be understood that they may also be implemented for other cellular network systems.

What is claimed is:

1. A method for controlling the management of handover in a cellular network, in which a provisioning base station of the cellular network provides a mobile base station with a radio interface to the cellular network, the method comprising:
   receiving a request from the mobile base station for handover information about one or more neighboring base stations of the provisioning base station; and
   communicating the handover information about the one or more neighboring base stations to the mobile base station by a management circuit of the cellular network, the handover information comprising one or more neighboring base stations to which a user equipment (UE) can be handed over from the mobile base station.

2. The method of claim 1, wherein the request comprises a predetermined identifier, the method further comprising:
   receiving a modified request from the provisioning base station, the modified request replacing the predetermined identifier in the request by an identifier associated with the provisioning base station,
   wherein the replacing the predetermining identifier is in response to the provisioning base station detecting the request from the mobile base station.

3. The method of claim 1, wherein the request comprises a predetermined identifier and a network entity further provides the radio interface by facilitating communications between the mobile base station and the provisioning base station, the method further comprising:
   detecting the request from the mobile base station to the core network, at the network entity; and
   communicating a modified request from the provisioning base station to the core network, the modified request replacing the predetermined identifier in the request by an identifier associated with the network entity.

4. The method of claim 2, wherein the step of communicating handover information about the one or more neighboring base stations to the mobile base station comprises:
   receiving the modified request at the management part of the cellular network;
   identifying the provisioning base station from the modified request; and establishing the handover information about the one or more neighboring base stations based on the identified provisioning base station.

5. The method of claim 1, wherein a network entity further provides the radio interface by facilitating communications between the mobile base station and the provisioning base station, the method further comprising:
receiving the request at the management part of the cellular network;
identifying the provisioning base station based on a mapping between the mobile base station and the network entity, in response to the request; and
establishing the handover information about the one or more neighboring base stations based on the identified provisioning base station.

6. The method of claim 1, wherein the request from the mobile base station comprises an indication of the provisioning base station, the method further comprising:
receiving the request at the management part of the cellular network; and
establishing the handover information about the one or more neighboring base stations based on the provisioning base station indicated in the request.

7. The method of claim 1, further comprising:
receiving handover information about the one or more neighboring base stations from the provisioning base station; and
wherein the step of communicating handover information to the mobile base station comprises communicating the handover information received from the provisioning base station to the mobile base station.

8. The method of claim 1, further comprising:
identifying a condition indicative that a handover is likely; and
wherein the step of communicating handover information is made in response to identifying the condition that a handover is likely.

9. The method of claim 8, wherein the mobile base station is configured for operation while mobile and wherein the step of identifying the condition indicative that a handover is likely comprises determining a mobility parameter for the mobile base station, the mobility parameter relating to a change in location for the mobile base station.

10. The method of claim 1, wherein the predetermined identifier is a known value indicative of a need to insert an identifier of the provisioning base station.

11. The method of claim 5, wherein the mapping associates the mobile base station with the provisioning base station.

12. A method for controlling the management of handover at a mobile base station in a cellular network, the mobile base station being configured for operation while mobile, the method comprising:
determining a mobility parameter for the mobile base station, the mobility parameter relating to a change in location for the mobile base station; and
communicating handover information about one or more neighboring base stations of a provisioning base station to the mobile base station based on the determined mobility parameter.

13. The method of claim 9, wherein the mobile base station is on board a vehicle and the step of determining a mobility parameter for the mobile base station comprises identifying an open or closed state for at least one door of the vehicle.

14. The method of claim 9, wherein the mobility parameter for the mobile base station relates to one or both of a physical velocity and a location for the mobile base station.

15. The method of claim 1, wherein the handover information comprises one or both of: information on one or more neighboring base stations; and a handover signalling area.

16. A non-transitory computer readable medium comprising instructions that when executed cause a processor to perform a method for controlling the management of handover in a cellular network, in which a provisioning base station of the cellular network provides a mobile base station with a radio interface to the cellular network, the method comprising:
communicating handover information about one or more neighboring base stations of the provisioning base station to the mobile base station by a management circuit of the cellular network.

17. A handover controller for controlling the management of handover in a cellular network, in which a provisioning base station of the cellular network provides a mobile base station with a radio interface to the cellular network, the handover controller comprising:
a radio interface circuit, configured to communicate handover information about one or more neighboring base stations of the provisioning base station to the mobile base station.

18. A handover controller for controlling the management of handover at a mobile base station in a cellular network, the mobile base station being configured for operation while mobile, the handover controller comprising:
a mobility determination circuit, configured to determine a mobility parameter for the mobile base station, the mobility parameter relating to a change in location for the mobile base station; and
a radio interface circuit, arranged to communicate handover information about one or more neighboring base stations of a provisioning base station to the mobile base station based on the determined mobility parameter.

19. A network entity of a cellular network, comprising a handover controller for controlling the management of handover in a cellular network, in which a provisioning base station of the cellular network provides a mobile base station with a radio interface to the cellular network, the handover controller comprising:
a radio interface circuit, configured to communicate handover information about one or more neighboring base stations of the provisioning base station to the mobile base station.

20. A network entity of a cellular network, comprising a handover controller for controlling the management of handover at a mobile base station in a cellular network, the mobile base station being configured for operation while mobile, the handover controller comprising:
a mobility determination circuit, configured to determine a mobility parameter for the mobile base station, the mobility parameter relating to a change in location for the mobile base station; and
a radio interface circuit, arranged to communicate handover information about one or more neighboring base stations of a provisioning base station to the mobile base station based on the determined mobility parameter.

* * * * *